United States Patent [19]

Suzuki et al.

[11] Patent Number: 4,808,312

[45] Date of Patent: Feb. 28, 1989

[54] CELLULOSE ESTER HOLLOW FIBER MEMBRANE FOR PLASMA SEPARATION

[75] Inventors: Mitsuru Suzuki; Makoto Ohno; Isamu Yamamoto, all of Otsu, Japan

[73] Assignee: Toyo Boseki Kabushiki Kaisha, Osaka, Japan

[21] Appl. No.: 900,584

[22] Filed: Aug. 26, 1986

[30] Foreign Application Priority Data

Jun. 10, 1986 [JP] Japan .................. 61-134035

[51] Int. Cl.$^4$ ...................... B01D 13/00; B01D 13/01
[52] U.S. Cl. ..................... 210/500.23; 210/500.31; 210/500.32
[58] Field of Search ............ 210/500.23, 500.29, 210/500.3, 500.31, 500.32; 55/158; 204/296; 429/255

[56] References Cited

U.S. PATENT DOCUMENTS 4,234,431  11/1980  Mishiro et al. ............... 210/500.3
4,459,210   7/1984  Murakami et al. ........... 210/500.23

Primary Examiner—Frank Sever
Attorney, Agent, or Firm—Wegner & Bretschneider

[57] ABSTRACT

A hollow fiber membrane made of a cellulose ester having a membrane thickness of not more than 75 μm, and having void volume (x, % by volume) of the membrane and a rate of ultrafiltration (y, ml/m$^2$.hr.mmHg) satisfying the following formula:

$$55x - 2500 \leq y \leq 48x + 600$$

wherein $x \geq 60$, and further has a β-lipoprotein sieving coefficient (sc) of not less than 0.95, and preferably having further not more than 2% of change ratio in the axial direction and in the radial direction when dipped freely in water at 121° C. for 20 minutes. Said hollow fiber membrane is useful for the medical use, such as the exchange of plasma in patients, collection of plasma from healthy donor, the pre-treatment of plasma for the collection and purification of valuable materials contained in plasma.

3 Claims, 1 Drawing Sheet

CELLULOSE ESTER HOLLOW FIBER MEMBRANE FOR PLASMA SEPARATION

This invention relates to a cellulose ester hollow fiber membrane suitable for the separation of plasma from blood. More particularly, it relates to a hollow fiber membrane made of a cellulose ester which is suitable for the medical use, such as the exchange of plasma in patients, collection of plasma from healthy donors, the pre-treatment of plasma for the collection and purification of valuable materials contained in plasma, and the like.

TECHNICAL BACKGROUND AND PRIOR ART

The technology of the separation of plasma from blood by a hollow fiber membrane had firstly been developed for the medical purpose, but the application thereof has nowadays been expanded to the collection of plasma from healthy donors (donorplasmapheresis).

That is, the hollow fiber membrane can be made compact in the volume with keeping the broad area of membrane and can be used in a cross-flow filtration system, and hence, it has widely been used, for instance, in micro filtration, ultrafiltration, in industrial uses such as desalination of sea water or brackish water and ultrapure water production, and further in medical usage such as purification of blood. Among these usages, a large demand is given to a membrane suitable for microfiltration which is used not only in industrial use such as purification of water in the field of foodstuff, and sterilization of draft beer or wine packed in bottle, but also in medical fields, such as for plasma exchange membrane in patients, and for collection of plasma which is necessary for meeting the increased demand of blood products.

In the treatment of diseases, plasma is separated from blood of patients under observing the state of the patients, and hence, high separation rate is not always required for membrane, but there are required high permeabilities of large molecular weight substances (e.g. immune complex) and stable plasma separation rate (i.e. the separtion rate being constant for a long period of time). Besides, in the case of donorplasmapherisis, the membrane used is required to be able to separate stably the plasma within a very short period of time in order to collect the plasma from healthy donors with little load and pain, and further it is required to have high permeabilities of substances having a large molecular weight like in the case of treatment of diseases. The main object of the donorplasmapheresis is to collect Factor VIII having a large molecular weight which is necessary for the treatment of hemophiliac, and hence, it is the most important that the membrane has a high permeability of the Factor VIII.

Many investigations have been done as to membrane suitable for plasma separation, but available membranes are not satisfactory in view of the stability in the plasma separation rate for the treatment of diseases and also for the collection of plasma and further not satisfactory in the permeability of large molecular weight substances (e.g. Factor VIII, immune complex, etc.).

Besides, a plasma separation module assembled with the plasma separation membrane is to be sterilized. The sterilization is usually carried out by treatment with EOG (ethylene oxide gas), formalin, or γ-ray, or in an autoclave, but in view of efficiency without any residue of the treating agent, the autoclave sterilization is favorable. However, when a separation module assembled with available membrane made of an cellulose ester is sterilized in an autoclave, the membrane is deformed because of less heat stability and the membrane properties can not be maintained.

SUMMARY OF THE INVENTION

The present inventors have intensively studied as to an improved plasma separation membrane having no defect as mentioned above and have found that by using a cellulose ester hollow fiber having a specific range of membrane thickness, a specific correlation between the void volume of the membrane and the ultrafiltration rate, a sieving coefficient of β-lipoprotein and a specific thermal change ratio, there can be obtained the desired membrane which can be sterilized in an autoclave and has stable plasma separation rate suitable for both medical treatment and collection of plasma and further has improved permeability of large molecular weight substances.

An object of the invention is to provide an improved hollow fiber membrane made of a cellulose ester which is suitable for the collection of plasma. Another object of the invention is to provide a hollow fiber membrane which can be sterilized in an autoclave and can permeate substances having a larger molecular weight such as Factor VIII and immune complex while keeping stably the high plasma separation rate for a long period of time. These objects and advantages of the invention will be apparent to persons skilled in the art from the following description.

BRIEF DESCRIPTION OF THE DRAWING

The accompanying

Figure 1:
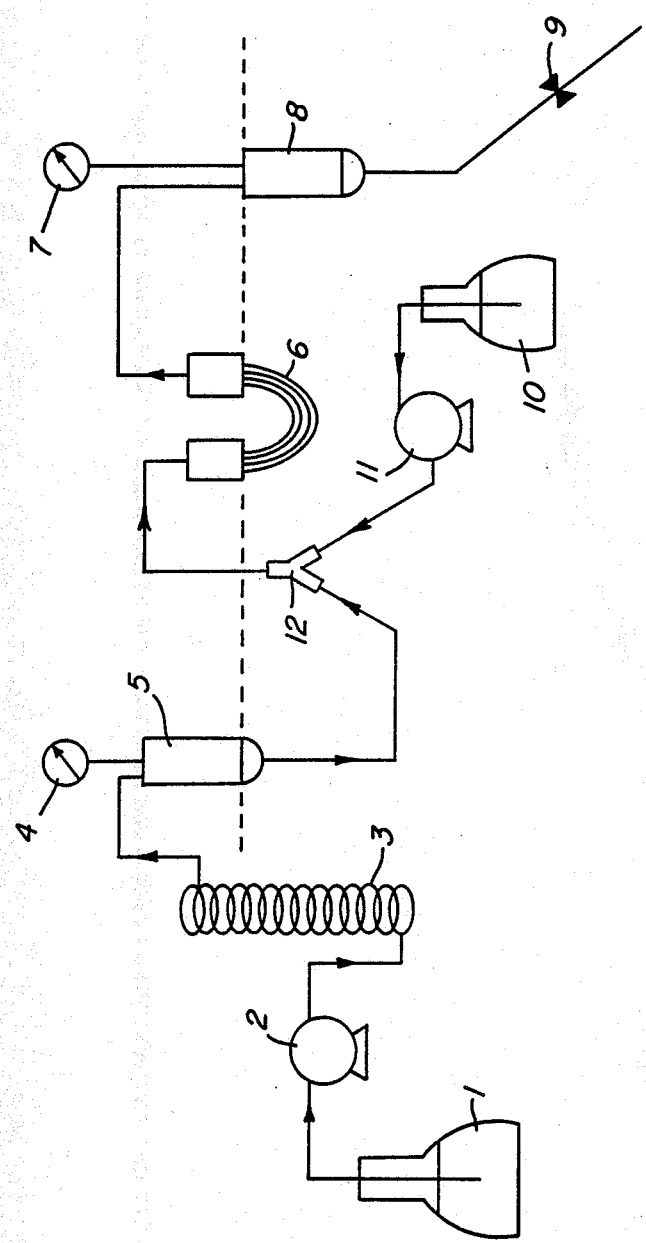
FIG. 1 shows a flow sheet for the measurement of a sieving coefficient of β-lipoprotein, wherein each symbol means as follows.

1: β-lipoprotein solution, 2: a pump for supplying a liquid, 3: a heat exchanger, 4: a pressure indicator, 5: a liquid storage vessel, 6: a module, 7: a pressure indicator, 8: a liquid storage vessel, 9: a screw cock, 10: a saline solution, 11: a pump for sending a liquid, 12: a three necked cock.

DETAILED DESCRIPTION OF THE INVENTION

The hollow fiber membrane made of a cellulose ester used in this invention has a membrane thickness of not more than 75 μm, and has a void volume (x, % by volume) of the membrane and a ultrafiltration rate (y, ml/m².hr.mmHg) satisfying the following formula:

$$55 - 2500 \leq y \leq 48x + 600$$

wherein $x \geq 60$, and further has a β-lipoprotein sieving coefficient (sc) of not less than 0.95, and preferably has further not more than 2 % of change ratio in the axial direction and in the radial direction when it is dipped in water at 121° C. for 20 minutes freely. Such a hollow fiber membrane can be sterilized in an autoclave and can stably keep the high plasma separation rate for a long period of time and further has improved permeability of large molecular weight substances, such as immune complex and Factor VIII.

When the ultrafiltration rate (y) is over "48x +600" in the above formula, the pores of the hollow fiber membrane are adhered with blood components, particularly with red cells, during the usage of the apparatus, and hence, the plasma separation rate is unfavorably decreased with lapse of time. On the other hand, when the rate (y) is less than "55x−2500", undesirable plugging of pores by the large molecular weight substances is increased with the time of treatment, and thereby the plasma separation rate is unfavorably decreased with lapse of time, too.

Besides, when the β-lipoprotein sieving coefficient (sc) is less than 0.95, it shows insufficient permeability of the large molecular weight substances such as immune complex and Factor VIII, and hence the membrane is not suitable for the medical treatment and for the collection of plasma. Moreover, when the hollow fiber membrane has a membrane thickness of more than 75 μm, undesirable plugging of pores is induced at the first stage of the treatment, and hence, the plasma separation rate is unfavorably fixed at a low level.

The ratio of change in the axial direction and in the radial direction is controlled so as to be less than 2 %, when the plasma separation module assembled with the hollow fiber membrane is dipped in water at 121° C. for 20 minutes at the state that the both ends of the membrane are free. This means that the membrane can be sterilized in an autoclave at the state that the both ends are fixed. When the rate of change is over 2 %, the inner diameter is distributed in the axial direction and further the membrane thickness is distributed in the radial direction during the sterilization in an autoclave, and hence, the membrane properties are unfavorably deteriorated.

Suitable cellulose esters used for the preparation of the hollow fiber membrane of the present invention include cellulose diacetate, cellulose triacetate, cellulose propionate, cellulose butyrate, cellulose acetate propionate and the like, which may be used alone or in combination of two or more thereof.

The hollow fiber membrane for plasma separation of the present invention can be prepared in the following manner.

A spinning solution is prepared by dissolving a polymer (i.e. a cellulose ester) in an aprotic polar solvent or mixing it in a non-solvent in a concentration of 20 % by weight or more. The spinning solution and an inner solution are extruded through a tube in orifice nozzle and then coagulated under the following conditions, so that the pore size of membrane is controlled.

Coagulation conditions: $0 < T_1 - T_2 \leq 40$ (°C.) wherein $T_1$ is an extrusion temperature, and $T_2$ is a temperature of the coagulation bath; and the concentration of the solvent or non-solvent in the coagulation bath and inner solution is >50% by weight.

The preparation of the hollow fiber membrane of this invention is explained in more detail below.

Preparation of the spinning solution:

The polymer is dissolved or mixed in an aprotic polar solvent having a boiling point of not lower than 150° C. or in a non-solvent in a polymer concentration of 20% by weight or more. The aprotic polar solvent includes N-methylpyrrolidone (b.p. 202° C.), dimethylformamide (b.p. 153° C.), dimethylacetamide (b.p. 164° C.), dimethylsulfoxide (b.p. 189° C.), and the like, and the non-solvent includes polyhydric alcohols which are soluble in water, such as ethylene glycol, triethylene glycol, polyethylene glycol, glycerin, polypropylene glycol, etc.; alcohols such as methanol, ethanol, etc.; and water, but should not be limited thereto.

Extrusion and coagulation step:

The spinning solution as prepared above is subjected to defoaming, heat treatment and filtration, and then extruded through a tube in orifice nozzle. During the extrusion, it is important to supply simultaneously an inner solution within the hollow center of the fiber. The inner solution is a water-soluble coagulation liquid which is usually an aqueous solution of the above-mentioned solvent and non-solvent in a concentration of the solvent or nonsolvent of 50% by weight or more.

After the extrusion, the resulting hollow fibers are coagulated in a coagulation bath containing an aqueous solution of the above-mentioned solvent or non-solvent. In the coagulation, it is also important to regulate the concentration of the solvent or non-solvent to 50% by weight or more like the inner solution.

It is also important for giving the membrane the desired properties that the temperature of the coagulation bath ($T_2$) at the coagulation step and the extrusion temperature of the tube in orifice nozzle ($T_1$) are regulated to satisfy the correlation of $0 < T_1 - T_2 \leq 40$ (°C.). That is, when there is no difference in the temperature of "$T_1 - T_2$" the hollow fibers can not sufficiently be coagulated and hence the membrane pores are not formed, but on the other hand, when the temperature difference "$T_1 - T_2$" is over 40° C., the coagulation rate in the forming of pores of membrane becomes too high like the above, and hence, the desired membrane properties can not be obtained.

The hollow fiber membrane thus formed is subsequently washed with water and wound up. The hollow fiber membrane is further subjected to heat treatment at 80° C. or higher, preferably to the treatment under the sterilization conditions in an autoclave, i.e. at 115° C. for 30 minutes, at 121° C. for 20 minutes, or at 126° C. for 15 minutes.

The β-lipoprotein (β-Lipo) sieving coefficient (sc) is measured in the following manner.

β-Lipo (Cohn Fraction III-O, manufactured by United States Biochemical Corporation, Cleveland, Ohio 44128) is dissolved in a phosphate buffered saline in a concentration of 30 mg/dl, and the solution is used in the following method.

Firstly, 42 hollow fiber membranes to be tested are bundled and both ends thereof are fixed with an adhesive so that the effective permeation length becomes 15 cm, from which a module is prepared so that the above solution passes through each hollow fiber. The module thus prepared is arranged as shown in the accompanying FIG. 1 (6 in FIG. 1). Air in the hollow fibers are purged with a saline solution 10 by supplying it with a pump 11. After confirming the complete air purge, a three necked cock 12 is switched and β-Lipo solution is supplied with a pump 2 to replace the saline solution. Immediately after the substitution, the inner pressure is regulated with a screw cock 9 so that the average pressure of indicators 4 and 7 becomes 50 mmHg within 5 minutes. The starting point of the measurement is the time when the regulation of pressure is finished. Maintaining the pressure at 50 mmHg for 15 minutes, the filtrate from the module 6 is collected for 2 minutes. Simultaneously, the solution to be supplied to the module and the solution passed through the module are sampled at the inlet and the outlet, respectively. The concentrations of the β-Lipo in the filtrate, the inlet sample solution and the outlet sample solution are measured by a colorimetry, and the value thus obtained is designated as 'a', 'b', and 'c', respectively. The β-Lipo sieving coefficient (sc) is calculated by the following equation using these value a, b and c:

$$sc = 2a/(b+c)$$

The ultrafiltration rate (y) can be obtained by measuring the unit pressure, unit area, an amount of water permeated per unit time.

The cellulose ester hollow fiber membrane as prepared above has excellent properties as mentioned hereinbefore, and has also the following specific structure of membrane.

That is, the plasma separation membrane of this invention has a structure containing a large size of pores and an average pore size (p) of the pores distributed in whole membrane walls and the standard deviation of the distribution ($\sigma$) satisfying the following formulae:

$$0.01 \ \mu m \leq p \leq 0.6 \ \mu m, \text{ and } \sigma/p \leq 1.0.$$

The structure of the surface active layer can be observed by an electron microscope. Besides, the pore distribution can be measured by a conventional mercury injection method. That is, according to the mercury injection method, the correlation of the injection pressure and the amount of mercury injected can be obtained, and further there can be calculated the pore size from the pressure and the number of pores from the amount of the injected mercury, and the void volume of membrane can also be calculated from the total amount of the injected mercury.

This invention is illustrated by the following Examples but should not be construed to be limited thereto, wherein % is % by weight unless specified otherwise.

EXAMPLE 1

Cellulose triacetate (25%), N-methylpyrrolidone (52.5%) and polyethylene glycol (molecular weight: 400, hereinafter referred to as "PEG 400", 22.5%) are mixed to prepared a spinning solution. The solution is extruded through a tube in orifice nozzle together with an inner solution [an aqueous solution of N-methylpyrrolidone (49%) and PEG 400 (21%)] and then introduced into a coagulation bath, wherein the extrusion temperature is 85° C. and the temperature of the coagulation bath is 75° C. The coagulation bath contains an aqueous solution of N-methylpyrrolidone (45.5%) and PEG 400 (19.5%). After being washed with water, the membrane is heat-treated at 121° C. for 20 minutes.

The hollow fiber membrane thus obtained has the properties as shown in Table 1.

TABLE 1

| | |
|---|---|
| Ultrafiltration rate (ml/m² · hr · mmHg) | 3,020 |
| Void volume (%) | 65 |
| Thickness of membrane ($\mu$m) | 49 |
| sc of $\beta$-Lipo | 0.96 |
| Initial plasma separation rate (ml/min · mmHg)* | 1.33 |
| SC of Factor VIII*** | 0.98 |
| Plasma separation rate after 30 min (ml/min · mmHg)** | 1.17 |
| SC of Factor VIII*** | 0.96 |

*It means a flow amount of filtered plasma 5 minutes after initiation of supplying of a blood [hematocrit (Ht) 40%] in a flow rate of 50 ml/min in a membrane module having an area of 0.25 m².
**It means a flow amount of filtered plasma 30 minutes after the initiation of supplying of a blood [Ht 40%] in a flow rate of 50 ml/min in a membrane module having an area of 0.25 m².
***The sieving coefficient (SC) is shown by the ratio of the concentration of plasma ($C_{in}$) in the initial blood before passing through the membrane to the concentration of plasma ($C_f$) in the filtrate, i.e. SC = $C_f/C_{in}$.

Besides, the hollow fiber membrane obtained above has a thermal change ratio (i.e. ratio of change after dipping freely in water at 121° C. for 20 minutes) as shown below.

| | |
|---|---|
| Change ratio in the axial direction (%) | 0.9 |
| Change ratio in the radial direction (%) | 1.0 |

[Note]
The change ratio is measured by dipping a hollow fiber membrane having a length (L) and a membrane thickness (d) in water at 121° C. for 20 minutes and thereafter measuring the length (L') and membrane thickness (d') of the thus-treated hollow fiber membrane and calculating from the following formulae:

$$\text{Change ratio in axial direction (\%)} = \left[\frac{L - L'}{L}\right] \times 100$$

$$\text{Change ratio in crosswise direction (\%)} = \left[\frac{d - d'}{d}\right] \times 100$$

EXAMPLE 2

Example 1 is repeated except that the temperature of the coagulation bath (75° C.) is changed to 70° C., and there is obtained a hollow fiber membrane. The membrane has the properties as shown in Table 2.

TABLE 2

| | |
|---|---|
| Ultrafiltration rate (ml/m² · hr · mmHg) | 1,600 |
| Void volume (%) | 65 |
| Thickness of membrane ($\mu$m) | 65.4 |
| sc of $\beta$-Lipo | 0.96 |
| Initial plasma separation rate (ml/min · mmHg) | 1.08 |
| SC of Factor VIII | 0.97 |
| Plasma separation rate after 30 min (ml/min · mmHg) | 1.01 |
| SC of Factor VIII | 0.95 |

EXAMPLE 3

Example 1 is repeated except that the concentration of cellulose triacetate in the spinning solution (25%) is changed to 20%, and there is obtained a hollow fiber membrane. The membrane has the properties as shown in Table 3.

TABLE 3

| | |
|---|---|
| Ultrafiltration rate (ml/m² · hr · mmHg) | 4,000 |
| Void volume (%) | 76 |
| Thickness of membrane ($\mu$m) | 72.0 |
| sc of $\beta$-Lipo | 0.95 |
| Initial plasma separation rate (ml/min · mmHg) | 1.58 |
| SC of Factor VIII | 0.93 |
| Plasma separation rate after 30 min (ml/min · mmHg) | 1.41 |
| SC of Factor VIII | 0.90 |

EXAMPLE 4

Example 3 is repeated except that the temperature of the coagulation bath (75° C.) is changed to 65° C., and there is obtained a hollow fiber membrane. The membrane has the properties as shown in Table 4.

TABLE 4

| | |
|---|---|
| Ultrafiltration rate (ml/m² · hr · mmHg) | 2,100 |
| Void volume (%) | 76 |
| Thickness of membrane ($\mu$m) | 70 |
| sc of $\beta$-Lipo | 0.95 |
| Initial plasma separation rate (ml/min · mmHg) | 1.21 |
| SC of Factor VIII | 0.92 |
| Plasma separation rate after 30 min (ml/min · mmHg) | 1.11 |
| SC of Factor VIII | 0.92 |

REFERENCE EXAMPLE 1

Example 1 is repeated except that the temperature of the coagulation bath (75° C.) is lowered to 40° C., and there is obtained a hollow fiber membrane. The membrane has the properties as shown in Table 5.

TABLE 5

| | |
|---|---|
| Ultrafiltration rate (ml/m² · hr · mmHg) | 1,020 |
| Void volume (%) | 67 |
| Thickness of membrane (μm) | 56 |
| sc of β-Lipo | 0.72 |
| Initial plasma separation rate (ml/min · mmHg) | 1.12 |
| SC of Factor VIII | 0.61 |
| Plasma separation rate after 30 min (ml/min · mmHg) | 0.58 |
| SC of Factor VIII | 0.40 |

As is clear from the above results, the membrane obtained in Reference Example 1 shows inferior plasma separation rate to that of the product of the present invention, that is, it is decreased with lapse of time.

REFERENCE EXAMPLES 2 to 6

Hollow fiber membranes are prepared under the conditions as shown in Table 6, and the properties of the membranes are also shown therein.

TABLE 6

| Ref. Ex. No. | Preparation conditions | y | x | Thickness of membrane (μm) | sc of β-Lipo | Initial plasma separation rate | SC of Factor VIII | Plasma separation rate after 30 minutes |
|---|---|---|---|---|---|---|---|---|
| 2 | The temp. of coagulation bath is further lowered 20° C. than Example 4 | 1650 | 78 | 72.5 | 0.96 | 0.52 | 0.90 | 0.30 |
| 3 | The thickness of membrane is set to 80.3 μm | 3600 | 65 | 80.3 | 0.95 | 0.40 | 0.92 | 0.38 |
| 4 | The thickness of membrane is set to 85 μm | 2150 | 78 | 85 | 0.96 | 0.41 | 0.92 | 0.37 |
| 5 | The composition of coagualation bath in Example 1 is changed as follows: N—methylpyrrolidone/ PEG 400 = 25%/20% | 3650 | 65 | 64.9 | 0.86 | 0.52 | 0.79 | 0.47 |
| 6 | The compostion of coagulation bath in Example 4 is changed as follows: N—methylpyrrolidone/ PEG 400 = 25%/15% | 2200 | 78 | 72.1 | 0.81 | 0.53 | 0.77 | 0.49 |

EXAMPLE 5

Cellulose triacetate (26%), N-methylpyrrolidone (51.8%) and PEG 400 (22.2%) are mixed to prepare a spinning solution. The solution is extruded through a tube in orifice nozzle together with an inner solution [an aqueous solution of N-methylpyrrolidone (49%) and PEG 400 (21%)] and then introduced into a coagulation bath, wherein the extrusion temperature is 85° C. and the temperature of the coagulation bath is 70° C. The coagulation bath contains an aqueous solution of N-methylpyrrolidone (45%) and PEG 400 (19.3%). After being washed with water, the membrane is heat-treated at 121° C. for 20 minutes.

The hollow fiber membrane thus contained has the following membrane structure.

Surface active layer . . . granular structure having a large pore size.

Structure of membrane wall . . . void volume: 65%, average pore size: 0.1 μm, standard deviation (σ): 0.05 and σ/p value: 0.5

REFERENCE EXAMPLE 7

Example 5 is repeated except that the polymer concentration is 15% and the temperature of the coagulation bath is 40° C., and there is obtained a hollow fiber membrane. The membrane has the following membrane structure.

Surface active layer . . . no granular structure

Structure of membrane wall . . . void volume: 79%, average pore size: 0.2 μm, standard deviation (σ): 0.32, and σ/p value: 1.6

EXPERIMENT 1

The hollow fiber membranes prepared in Example 5 and Reference Example 9 were subjected to the test for collection of plasma from blood. That is, bovine blood was passed through the membrane, and the change of properties with lapse of time was measured by checking the sieving coefficient (SC) of total cholesterol at two points of 15 minutes and 30 minutes after the initiation of membrane collection. Besides, the permeability of microparticles was also evaluated by measuring sieving coefficient with Dow Uniform Latex 380 Å, in order to check the permeability of the membranes. The results are shown in Table 7.

TABLE 7

| | Collection of plasma from bovine blood (SC value) | | SC measured with Uniform Latex 380Å |
|---|---|---|---|
| Ex. No. | 15 min | 30 min | |
| Ex. 5 | 0.95 | 0.94 | 0.89 |
| Ref. Ex. 7 | 0.72 | 0.60 | 0.74 |

[Note]: The sieving efficient (SC) is shown by the ratio of the concentration of plasma ($C_{in}$) in the initial blood before passing through the membrane to the concentration of plasma ($C_f$) in the filtrate, i.e. SC = $C_f/C_{in}$.

[Note]: The sieving efficient (SC) is shown by the ratio of the concentration of plasma ($C_{in}$) in the initial blood before passing through the membrane to the concentration of plasma ($C_f$) in the filtrate, i.e. SC=$C_f/C_{in}$.

As is clear from the above test results, the follow fiber membrane of this invention did not show any lowering of the plasma separation rate with lapse of time, but on the other hand, that of the reference example showed significant lowering of the rate with lapse of time. Besides, the membrane of this invention showed higher permeability of microparticles than that of the membrane of the reference example. The hollow fiber membrane of the reference example has a broad distribution of pores in whole area of the membrane, and hence the microparticles are trapped within the membrane, and thereby the permeability becomes lower.

What is claimed is:

1. A hollow fiber membrane made of a cellulose ester for separation of plasma, which comprises a hollow fiber membrane having a heat stability sufficient to substantially precude deformation when assembled in a module which is sterilized in on autoclave, and having a membrane thickness of not more than 75 μm, and having void volume (x, % by volume) of the membrane and a rate of ultrafiltration (y, ml/m².hr.mmHg) satisfying the following formula:

$$55x - 2500 \leq y \leq 48x + 600$$

wherein $x \geq 60$, and further having a β-lipoprotein sieving coefficient (sc) of not less than 0.95.

2. The hollow fiber membrane according to claim 1, which has further not more than 2% of change ratio of length in the axial direction and in the radial direction when it is dipped in water at 121° C. for 20 minutes in the state that the both ends of the membrane are made free.

3. A hollow fiber membrane of a cellulose ester for separation of plasma, which comprises a hollow fiber membrane having a heat stability sufficient to substantially precude deformation when assembled in a module which is sterilized in on autoclave, and having an average pore size (p) of the pores distributed in whole membrane walls and the standard deviation of the distribution (σ) satisfying the following formulae:

$$0.01 \ \mu m \leq p \leq 0.6 \ \mu m, \text{ and } \sigma/p \leq 1.0.$$

* * * * *